United States Patent [19]

Di Rado et al.

[11] Patent Number: 5,106,447
[45] Date of Patent: Apr. 21, 1992

[54] BONDING METHOD EMPLOYING HOT MELT ADHESIVES FOR INSULATION ASSEMBLY

[75] Inventors: Lisa Di Rado, Hoboken, N.J.; Francis X. Brady, Bethlehem, Pa.

[73] Assignee: National Starch and Chemical Investment Holding Corporation, Wilmington, Del.

[21] Appl. No.: 553,922

[22] Filed: Jul. 17, 1990

[51] Int. Cl.$^5$ .............................................. C09J 5/02
[52] U.S. Cl. ......................... 156/334; 156/71; 237/13; 237/46; 428/282; 525/190; 525/240
[58] Field of Search ............... 156/334, 71; 428/282; 525/190, 240; 237/13, 46

[56] References Cited

U.S. PATENT DOCUMENTS

| | | |
|---|---|---|
| 3,573,240 | 3/1971 | Flanagan . |
| 3,803,067 | 4/1974 | Kehr . |
| 4,242,473 | 12/1980 | Nametz . |
| 4,257,931 | 3/1981 | Granzow . |
| 4,278,591 | 7/1981 | Granzow . |
| 4,568,713 | 2/1986 | Hansen et al. . |
| 4,732,921 | 3/1988 | Hochberg . |
| 4,761,450 | 8/1988 | Lakshmanan et al. . |
| 4,816,306 | 3/1989 | Braky et al. . |
| 4,824,889 | 4/1989 | Mostert . |
| 4,826,909 | 5/1989 | Lakshmanan et al. . |
| 4,833,192 | 5/1989 | Lakshmanan et al. . |

OTHER PUBLICATIONS

"Improve the Performance of your Hot Melt Adhesives and Sealants with Shell Duraflex Polybutylene Polymers", Shell Chemical Company.
"Polybutylene—A New Polymer for Hot Melt Adhesives", Shell Chemical Company.
Duraflex—Polybutylene Specialty Resins Properties Guide, Shell Chemical Company.

*Primary Examiner*—John J. Gallagher
*Attorney, Agent, or Firm*—Ellen T. Dec; Edwin M. Szala

[57] ABSTRACT

Insulation assemblies for the HVAC industry are bonded by spray application of a hot melt adhesive composition comprising 10 to 50 percent of an isostatic thermoplastic polybutene-1/ethylene copolymer containing from about 5.5 to about 10% by weight ethylene; 20 to 50 percent of a tackifier; 15 to 50 percent of an amorphous diluent having a softening point greater than 90° C.; 0 to 2 percent antioxidant; and 0 to 5 percent wax.

11 Claims, No Drawings

BONDING METHOD EMPLOYING HOT MELT ADHESIVES FOR INSULATION ASSEMBLY

In the manufacture of heating, ventilating and air conditioning units (HVAC), adhesives are used to attach fiberglass insulation to the metal housings to protect against weather, to reduce sound, to stop water vapor from forming on the metal and to separate the hot compression units from the cold freon gas coils.

Due to environmental concerns, the HVAC industry has begun to replace the traditionally used solvent based adhesives with waterborne or hot melt adhesive compositions. In this regard, hot melt adhesives have a number of advantages over either solvented or waterborne systems. Thus, because hot melts do not contain solvents, they do not cause the environmental concerns that solvented or some waterborne systems do; hence current ventilated spray booths used for solvented products may not be needed. In addition, hot melt adhesives set up immediately, allowing for faster production rates. Set up time of hot melt adhesive is not as dependent on heat/humidity conditions as waterborne system, which translates into more trouble-free production. Another advantage of hot melt adhesives is their economy in application, producing a 20-25% cost savings at recommended coating levels.

However, hot melt adhesives have not generally been adopted by the HVAC industry since standard pressure sensitive hot melt adhesives cannot pass the stringent Underwriters Laboratory (UL) fire retardancy tests, due to the presence of plasticizers which greatly cut down on heat resistance. Some pressure sensitive products marketed for HVAC usage have additives such as alumina trihydrate, antimony oxide or calcium carbonate to provide fire retardancy. These inorganic "filled" pressure sensitive products have many disadvantages, such as damage to machinery, reduced adhesion, toxicity, poor spraying, phase separation and less value per pound.

We have now found that superior hot melt adhesive compositions for use in HVAC insulation bonding may be prepared from 10 to 50 weight percent of an isotactic thermoplastic polybutene-1/ethylene copolymer containing from about 5.5 to about 10% by weight ethylene (polybutylene); 20 to 50 percent of a tackifier; 15 to 50 percent of an amorphous diluent having a softening point greater than 90° C.; 0 to 2 percent of a stabilizer; and 0 to 5 percent wax.

The adhesives described herein are particularly useful for the HVAC insulation bonding application since they possess an open time for bonding of at least one minute and can be sprayed onto either the metal housing or the fiberglass batting and can be utilized at sufficiently low coating levels so that the adhesive itself will not contribute to smoke or flame spread and thus require no deleterious inorganic fillers.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of "melt index", the applicable isotactic polybutylenes to be used in the present adhesive should exhibit a melt index in the range of from about 5 to 2000 dg/min and preferably from 400 to 700 dg/min. The latter melt flow values are determined by the method described in ASTM D 1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80° C.-150° C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical; (3) aliphatic petroleum hydrocarbon resins having a Ball and Ring softening point of from about 80°-160° C., resulting from polymerization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) partially and fully hydrogenated hydrocarbon resins such as Resin H-130 from Eastman, Escorez 5000 series from Exxon, and Regalrez from Hercules.

The amorphous diluents which are needed and present in the adhesive composition include (atactic) amorphous polypropylene or other similar high softening point (i.e. greater than 90° C.), low crystalline diluent, (e.g. amorphous polyalphaolefins). These diluents, are used at levels of 20 to 50% by weight, preferably about 20 to 25% by weight.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris(3,5-di-tert-butyl-4-hydroxy-benzyl)benzene; pentaerythrityl tetrakis-3(3,5-di-tert-butyl-4-hydroxyphenyl)-propionate; 4,4'methylenbis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.0%.

It is also possible to add minor amounts (i.e. less than about 5% by weight of the formulation) of other diluents such as (1) waxes including petroleum waxes such as a paraffin wax having a melting point of from about 50°-75° C. and microcrystalline wax having a melting point of from about 60°–90° C.; the latter melting points being determined by ASTM method D127-60; (2) low molecular weight (600 to 3000) liquid polybutene; (3) polyethylene greases having a softening point of from about 80°–100° C. and a hardness value, as determined by ASTM method D-1321, of from about 60°–120° C.; (4) hydrogenated animal, fish and vegetable fats and oil such as hydrogenated tallow, lard, soya oil, cotton seed oil, castor oil, menhaden oil and cod liver oil; and (5) synthetic waxes made by polymerizing carbon monoxide and hydrogen, such as Fischer-Tropsch wax.

In addition, relatively small amounts (less than about 5%) of isotactic polypropylene may be employed as a reinforcing agent.

Other additives such as flow modifiers, pigments, dyestuffs, etc., which are conventionally added to hot melt adhesives for various end uses may also be incorporated in minor amounts into the formulations of the present invention.

The adhesive compositions are prepared by blending the components in the melt at a temperature of about 130°–200° C. until a homogeneous blend is obtained, approximately 2 hours. Various methods of blending are known to the art, and any method that produces a homogeneous blend is satisfactory. An exemplary procedure involves placing the polybutylene copolymer, amorphous diluent, and antioxidant(s) preferably under an inert gas environment, in a jacketed mixing kettle, preferably of the Baker-Perkins or Day type, which is equipped with rotors and thereupon raising the temperature to a range of from about 120°–180° C. When the mixture has been masticated to a uniform consistency, the tackifying resin and the remaining components are slowly added over a period in order to avoid the formation of lumps. Mixing and heating are continued until a smooth, homogeneous mass is obtained whereupon the remainder of the tackifying resin is thoroughly and uniformly admixed therewith.

When utilized under conventional manufacturing applications, the resulting adhesive compositions are far superior to commercially available adhesives.

Thus, the adhesives are a temporary pressure sensitive product in that when sprayed, they act as a pressure sensitive, with adequate open time for bonding of up to about 1 minute or more. However, the adhesives lose their pressure sensitivity over time through slow crystallization. Within 24 hours, the adhesive crystallizes and optimum bond strength and complete loss of pressure sensitivity occurs. This makes the adhesives of the invention excellent products for the HVAC market because they have adequate open time for spraying, yet crystallize hours later. Once they lose their pressure sensitivity, they allow for very easy clean-up from application machinery and surrounding areas.

A second favorable aspect of these adhesives is their high heat resistance. Once they have crystallized, they develop very high heat resistance, significantly higher than standard hot melt adhesives when subjected to the UL abnormal temperature test.

It is an advantage that the present adhesives may readily be applied by spraying from suitable apparatus and nozzles onto either the metal housing or the fiberglass batting using techniques conventionally employed in the HVAC industry. In order to meet UL specifications, it is desirable that as little adhesive as possible is used. In most instances, about 0.5–5 grams of adhesive per 929 sq. centimeters (1.0 sq. foot) is sufficient to obtain adequate bonds while maintaining fire resistant properties.

The following examples will further illustrate the embodiments of this invention. In these examples all parts given are by weight unless otherwise noted.

EXAMPLE I

This example illustrates the preparation of a hot melt adhesive composition useful in the present invention.

A kettle which had been heated to 150° C. and which was equipped with a stirring paddle was charged with 20 parts amorphous polyalphaolefin (Rextac 2305, Rexene Chemical), 35 parts polybutylene (Duraflex 8910, Shell), and 45 parts Resin H-130 (Eastman), an aliphatic hydrocarbon tackifier having a softening point of 130° C. Then 0.5 parts Irganox 1010 (Ciba-Geigy), a hindered polyphenol antioxidant, was added. This mixture was completely melted with heating and stirring continued until a homogeneous mass was obtained.

The homogeneous hot melt composition described above (designated Adhesive A) had a viscosity of 5,975 centipoises (cps.) at 350° F., as determined by a Brookfield viscometer using a number 27 spindle at 20 r.p.m.

Additional formulations, designated Adhesives B–D, were also prepared using the procedure described above and are shown in Table 1.

TABLE 1

| Adhesive | A | B | C | D | (parts) |
|---|---|---|---|---|---|
| Polybutylene (Duraflex 8910, Shell Chemical) | 35 | 10 | 40 | 15 | |
| Amorphous polyalphaolefin (Rextac 2305) | 20 | 50 | 25 | 20 | |
| Tackifier (Resin H-130, Eastman) | 45 | 40 | 25 | 65 | |
| Alpha Methyl Styrene/Vinyl Toluene Resin (Kristalex 3085, Pennsylvania Industrial Chemical Corp.) | — | — | 10 | — | |
| Antioxidant (Irganox 1010) | 0.5 | 0.5 | 0.5 | 0.5 | |

The resultant adhesive formulations were subjected to various tests using the procedures described below. The results of the testing are shown in Tables 2, 3 and 4.

TEST PROCEDURES

Melt viscosities of the hot melt adhesive were determined at 350° F. on a Brookfield Model RVT Thermosel viscometer using a number 27 spindle at 20 r.p.m.

Elevated temperature peel and elevated temperature shear—Test specimens for determining elevated temperature peel and shear strengths were prepared as follows: an adhesive pattern 1 inch wide was applied at 175° C. to a strip of 50 pound Kraft paper, 1 inch wide by 3 inches long, across the width of the paper. A second piece of Kraft paper of the same dimensions was immediately placed over the first piece and a 200 gram weight placed on top of the composite construction. The compressed adhesive width was 1 inch.

Elevated temperature peel and elevated temperature shear values were determined by attaching a 100 gram weight to each specimen and placing the specimens in a forced-draft oven. The temperature was raised in 5.5° C. (10° F.) increments from 38° C. The specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds.

Heat Stability—The heat stability of the adhesives was determined by placing a 60 gram sample of the test adhesive into a glass jar which was then covered by aluminum foil. The covered jar was placed in an oven set at 350° F. for 24, 48 or 72 hours. At the end of the appropriate period, the adhesive was examined for color, skinning and gelling. A melt viscosity at 350° F. was obtained as described above. A significant loss of viscosity is undesirable.

Open Time Testing—Using a Meltex MP300 spray gun, 1.8 to 5 g/ft² of adhesive was sprayed at 375° F. onto acrylic coated aluminum. One inch strips of ½ pcf fiberglass were applied, with moderate hand pressure, at 15 second intervals. Bonds were aged 24 hours at 71° F./50% relative humidity (RH) and then peeled by hand to check adhesion.

Abnormal Temperature Test—Using a Meltex MP300 spray gun, 1.8 to 5 g/ft² of adhesive was sprayed at 375° F. to various metals. Various density and types of fiberglass were applied immediately and after 30 second opentime. Bonds were aged 24 hours at 71° F./50% RH and then hung vertically in a 426° F. oven for 7 and 24 hours. Failure was noted when the fiberglass fell off the metal.

TABLE 2

| Adhesive | A | B | C | D |
|---|---|---|---|---|
| Viscosity @ 350° F. (cps) | 5975 | 775 | 10,000 | 1950 |
| Peel Value (°F.) | 140° | 120° | 120° | 150° |
| Shear Value (°F.) | 180° | 230° | 190° | 170° |
| Open time | 1 min | 1 min | 1 min | 10 sec |
| Heat Stability 72 hrs. 350° F., 60 grams | | | | |
| color | amber | * | amber | amber |
| skin | no | * | no | no |
| gels | no | * | no | no |
| final viscosity @ 350° F. (cps) | 5625 | * | * | 1770 |

*Not tested

As the results presented in Table 2 show, hot melt compositions containing more than about 50% tackifier are deficient with respect to open time.

The adhesive designated Adhesive C was also subjected to various tests which simulated conditions found in the HVAC industry. The results of the tests were compared to those for similar tests performed on two competitive products, one an antimony oxide filled styrene butadiene styrene (SBS) based adhesive, the other an atactic polypropylene based (APP) product.

TABLE 3

| | Adhesive C | SBS | APP |
|---|---|---|---|
| Viscosity | | | |
| @300° F. | — | — | 3,900 cps |
| @350° F. | 10,000 cps | 17,100 cps | 1,045 cps |
| @375° F. | 7,000 cps | 8,550 cps | — |
| Softening Point | 230° F. | 252° F. | 290° F. |
| Peel | 120° F. | 160° F. | 100° F. |
| Shear | 190° F. | Adj. 180° F. | 240° F. |
| Heat Stability 24 hours | | | |
| skin | none | ½ skin | none |
| gel | none | none | none |
| separation | none | opaque white bottom layer | transparent white bottom layer |
| volatile char | moderate | heavy | moderate |
| edge ring | light | heavy | none |

TABLE 3-continued

| | Adhesive C | SBS | APP |
|---|---|---|---|
| 48 hours | | | |
| skin | none | full skin | none |
| gel | none | none | none |
| separation | none | opaque white bottom layer | transparent white bottom layer |
| volatile char | moderate-heavy | heavy | moderate |
| edge ring | heavy | heavy | none |

TABLE 4

| UL Abnormal Temperature Test | Adhesive C | SBS | APP |
|---|---|---|---|
| Acrylic Coated /Aluminum to ½ pcf Fiberglass Bonded immediately | | | |
| Coating Weight | 3.2 g/ft.² | 3.2 g/ft.² | 2.6 g/ft.² |
| 7 hours | Pass | Pass | Pass |
| 24 hours | Pass | Fail (Fell off) | Fail (Slipped down) |
| FSK (Foil Skrim Kraft) Fiberglass to oily steel Bonded Immediately | | | |
| Coating Weight | 4.0 g/ft.² | 4.0 g/ft. | * |
| 7 hours | Pass | Fail (After 2 hours) | |
| 14 hours | Pass | Fail | |
| 30 second open time | | | |
| Coating Weight | 2.2 g/ft.² | 4.0 g/ft.² | * |
| 7 hours | Pass | Fail (After 2 hours) | |
| 14 hours | Pass | Fail | |
| Black edged fiberglass to oily steel Bonded Immediately | | | |
| Coating Weight | 4.7 g/ft.² | 4.7 g/ft.₂ | * |
| 7 hours | Pass | Fail (After 2 hours) | |
| 14 hours | Pass | Fail (After 2 hours) | |
| 30 second open time | | | |
| Coating Weight | 1.8 g/ft.² | 2.1 g/ft.² | * |
| 7 hours | Pass | Fail (After 2 hours) | |
| 14 hours | Pass | Fail | |

*Not tested

As the results presented in Table 4 indicate, in testing simulations of UL's 426° F. abnormal temperature test required by the HVAC industry, Adhesive C of the invention outperformed the competitive products. On standard ½ pound per cubic foot fiberglass to acrylic coated aluminum, Adhesive C passed for 24 hours while both competitive products failed before 24 hours. In addition, on conventional fiberglass/oily steel construction, Adhesive C passed for 24 hours while the SBS based product failed after only 2 hours.

Additionally, the adhesives of the invention have very good pot stability. As shown in Table 3, after 48 hour/350° F. testing, Adhesive C did not develop skin, gel or separate. On the other hand, both competitive products showed serious separation and the SBS product even developed a skin. This improved pot stability will provide the HVAC manufacturer trouble-free running.

Further, since the adhesives of the invention do not contain any inorganic filler, they will not excessively wear out machinery as do inorganically filled products. Also, because they do not contain a filler, they have a lower density than the competitive SBS and thus provide more adhesive volume per pound resulting in a lower cost in usage. Finally, they will not have the health hazards associated with the use of inorganic/halide combinations.

Another advantage of the adhesives of the invention are their good machining. They can be sprayed easily, such that very low levels, down to 0.5 g/ft$^2$ provide excellent adhesion of fiberglass to metal. This is an advantage over the competitive SBS product which did not machine well due to the filler content. It was also difficult to apply low levels of adhesive of the APP based product since gritting from the larger amounts of by-product isotactic polypropylene present caused very poor spray patterns.

Furthermore, Adhesive C was submitted to the Underwriters Laboratory for approved use in HVAC units. In evaluating the adhesive, the composition was subjected to UL-465 test for central air conditioners, and UL-727 test for oil-fired central furnaces. Substrates generally used for this test are ½ pcf to 1½ pcf (pound per cubic foot) fiberglass to four metals: alkyd painted steel, acrylic painted steel, cold rolled steel and galvanized steel. Bonds are exposed to the following test conditions:

Accelerated aging—30 and 60 days @ 316° F.
Humidity exposure—30 and 60 days @ 140° F./97% RH
Cycle exposure—24 hours @ 194° F., 24 hours @ 140° F./97% RH
Low Temperature exposure—24 hours @ −40° F.
Abnormal temperature exposure—7 hours @ 426° F.

An additional test involved in the UL Component-Adhesives, Insulation test is the UL-723 tunnel test. This is required for all constructions used in air handling compartments. UL-723 involves burning adhesive that has been coated onto inorganic reinforced cement board. Flame spread as well as smoke generation are measured. Adhesive C passed these UL test procedures and is therefore one of the few UL approved hot melt adhesives for use in the HVAC industry.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specifications.

We claim:

1. In a method for the bonding of a metal housing substrate to a fiberglass insulation substrate in the production of HVAC units wherein an adhesive is applied to one of the substrates to be bonded prior to placing the substrates in contact with each other, the improvement which comprises utilizing as the adhesive therefor a sprayable hot melt adhesive composition consisting essentially of 10 to 50 weight percent of an isotactic thermoplastic polybutene-1/ethylene copolymer containing from 5.5 to 10 weight percent ethylene, 20 to 50 percent of a tackifier, 15 to 50 percent of an amorphous diluent having a softening point greater than 90° C., 0 to 2 percent antioxidant, and 0 to 5 percent wax.

2. The method of claim 1 wherein the hot melt adhesive is sprayed at a coating weight of 0.5 to 5 grams per square foot.

3. The method of claim 1 wherein the isotactic polybutene-1/ethylene copolymer used in the adhesive has a melt index of 5 to 2000 dg/min.

4. The method of claim 3 wherein the isotactic polybutene-1/ethylene copolymer used in the adhesive has a melt index of 400 to 700 dg/min.

5. The method of claim 1 wherein the amorphous diluent is amorphous polypropylene or amorphous polyalphaolefin.

6. The method of claim 1 wherein the tackifying resin used in the adhesive is selected from the group consisting of hydrogenated wood rosin or rosin ester; polyterpene resins having a softening point of 80°-150° C.; aliphatic petroleum hydrocarbon resins having a Ball and Ring softening point of 80°-160° C.; and hydrogenated hydrocarbon resins.

7. The method of claim 6 wherein the tackifying resin is a hydrogenated hydrocarbon resin.

8. The method of claim 6 wherein the tackifying resin is an aliphatic petroleum hydrocarbon having a Ball and Ring softening point of 80° to 160° C.

9. The method of claim 1 wherein there is additionally present in the adhesive minor amounts of other diluents selected from the group consisting of low molecular weight liquid polybutene, petroleum waxes having a melt point of from about 50°-75° C., microcrystalline wax having a melting point of from about 60°-90° C., polyethylene greases having a softening point of from about 80°-100° C. and a hardness value of from about 60-120, hydrogenated animal, fish and vegetable fats and oil, and synthetic waxes.

10. The method of claim 1 wherein there is additionally present in the adhesive up to about 5 percent by weight of isotactic polypropylene.

11. The method of claim 1 wherein the adhesive contains 15 to 50 percent by weight of amorphous polyalphaolefin.

* * * * *